United States Patent [19]

Suzuki et al.

[11] Patent Number: 5,058,097
[45] Date of Patent: Oct. 15, 1991

[54] SLIDER CONTROLLER FOR DISK PLAYER INCLUDING A SLIDER WHICH IS DRIVEN BY A LINEAR MOTOR

[75] Inventors: Takashi Suzuki; Kyoichi Kato, both of Saitama, Japan

[73] Assignee: Pioneer Electronic Corporation, Tokyo, Japan

[21] Appl. No.: 426,267

[22] Filed: Oct. 25, 1989

[30] Foreign Application Priority Data

Feb. 27, 1989 [JP] Japan .................................. 1-48309
Mar. 7, 1989 [JP] Japan .................................. 1-54197

[51] Int. Cl.$^5$ ........................ G11B 17/30; G11B 17/00
[52] U.S. Cl. .................................... 369/215; 369/219; 369/244
[58] Field of Search .............. 369/215, 219, 244, 77.1, 369/77.2, 221

[56] References Cited

U.S. PATENT DOCUMENTS

| | | | |
|---|---|---|---|
| 4,260,162 | 4/1981 | Morii et al. | 369/215 X |
| 4,437,181 | 3/1984 | Kishima | 369/215 X |
| 4,634,853 | 1/1987 | Kanamaru | 250/201 |
| 4,914,647 | 4/1990 | Ono et al. | 369/244 X |
| 4,922,477 | 5/1990 | Miura | 369/244 X |
| 4,935,916 | 6/1990 | Suzuki et al. | 369/219 X |
| 4,942,562 | 7/1990 | Suzuki | 369/219 X |

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A slider controller for a disk player including a slider which supports an optical pickup and which is driven by a linear motor. The linear motor for moving the slider is supported on an auxiliary chassis. The auxiliary chassis is swingably mounted with respect to a main chassis of the disk player so that the optical axis of an information reading light beam emitted from the pickup can be adjusted to keep the axis perpendicular with respect to the surface of the disk. The slider controller further includes a pushing cam, a locking plate and a drive member. Upon operation of the drive member, the pushing cam is moved by the drive member to push a contact surface of the locking plate such that a locking portion of the locking plate is engaged with the slider during a stoppage mode of the disk player. Therefore, the slider is locked by the locking plate despite the adjustment of the inclination of the slider.

6 Claims, 3 Drawing Sheets

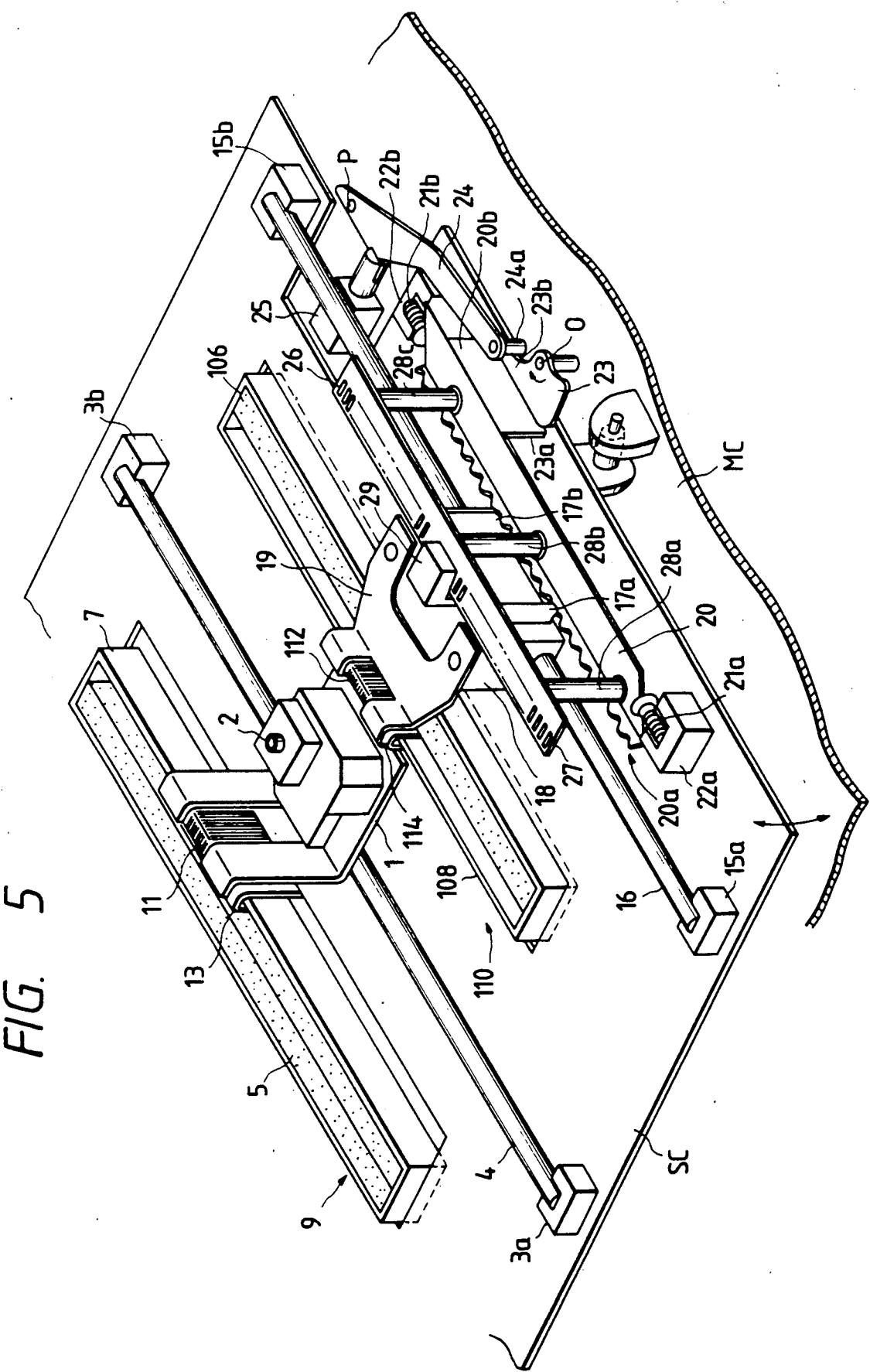

SLIDER CONTROLLER FOR DISK PLAYER INCLUDING A SLIDER WHICH IS DRIVEN BY A LINEAR MOTOR

BACKGROUND OF THE INVENTION

The present invention relates to a slider controller, particularly to a slider controller for a disk player having a tilting mechanism.

In a conventional player for an information record disk such as a video disk or a digital audio disk, a slider, which supports a pickup for reading recorded information from the disk and is movable in the radial direction of the disk, is linearly moved by a rotary motor whose rotation is converted into the linear motion through a means such as a combination of gears and a rack in a speed-reducing manner. Since the responding property of the rotary motor is limited, the speed of a search in which the pickup is rapidly moved to search for a desired recording track is limited. However, there has been a strong desire to increase the speed of the search. It is conceivable to use a linear motor which is highly responsive, instead of the rotary motor, to move the slider directly.

In a video disk player as noted above, a tilting mechanism for adjusting the inclination of an optical pickup (so that the optical axis of an information reading light beam emitted from the pickup is made perpendicular to the information recording surface of a video disk) is provided in order to prevent cross-talk between mutually adjacent tracks. In the tilting mechanism, a guide shaft by which a slider is movably supported is disposed so that the guide shaft can be tilted to adjust the inclination of the pickup. If a linear motor, which is used as a driver for moving the slider, is tilted together with the guide shaft, a problem arises in that the load on a tilting driver is increased because the weight of the magnetic circuit section of the linear motor is large.

SUMMARY THE INVENTION

The present invention was made in order to solve the above-mentioned problem.

Accordingly, it is an object of the present invention to provide a slider controller for a disk player including a slider having a small coefficient of static friction as in the case of using a linear motor as a driver for moving the slider and has a locking mechanism for appropriately locking the slider. The disk player includes a tilting mechanism and an auxiliary chassis. The inclination of the optical pickup of the disk player is adjusted by the tilting mechanism so that the optical axis of an information reading light beam emitted from the pickup is made perpendicular to the information recording surface of an information record disk. The auxiliary chassis supports a drive mechanism for moving the slider supporting the pickup in the radial direction of the disk. The auxiliary chassis is supported so that it can be swung, relative to the main chassis of the disk player, in a direction within a plane containing the optical axis of the pickup. The plane is defined by a line intersecting the optical axis at the optical pickup and extending parallel to a guide shaft 4.

The slider controller includes a movable member movable in a direction intersecting a plane parallel with the direction of the swinging of the auxiliary chassis, a drive means supported on the main chassis so as to move the movable member, and a locking means. The locking means is supported on the auxiliary chassis and has a contact surface, which is kept in contact with the movable member, and a locking portion, which is engaged with or disengaged from the slider by the movement of the contact surface. The slider, which is easy to move, is surely kept in its present position by the locking means even if a disturbance such as external vibration acts on the disk player during the stoppage mode thereof. Since the locking means is supported on the auxiliary chassis and the movable member and a driver for moving the member are supported on the main chassis, the locking means is tilted together with the slider no matter what position the slider is tilted to. Therefore, the slider is surely locked by the locking means despite the adjustment of the inclination of the slider. Since the driver for moving the movable member is provided on the main chassis, the load on a driver for adjusting the inclination of the slider is small.

It is another object of the present invention to provide a slider drive mechanism which is for a disk player having a tilting mechanism and in which the load on a tilting driver, in the case of using a moving-coil linear motor as a driver for moving a slider, is reduced. In the disk player, an auxiliary chassis supporting a guide shaft for the slider is supported so that the auxiliary chassis can be swung, relative to a main chassis, in a direction within a plane containing the optical axis of the optical pickup of the disk player. Since the magnetic circuit section of the linear motor is supported on the main chassis so that the weight borne by the auxiliary chassis is diminished, the load on the tilting driver is reduced.

BRIEF DESCRIPTION OF THE DRAWINGS

FIG. 5 is a schematic view of a slider drive mechanism which is another embodiment of the present invention and is provided with a slider controller according to the present invention.

DETAILED DESCRIPTION OF THE PREFERRED EMBODIMENTS

Embodiments of the present invention are hereafter described in detail with reference to the drawings attached hereto.

Figure 1:
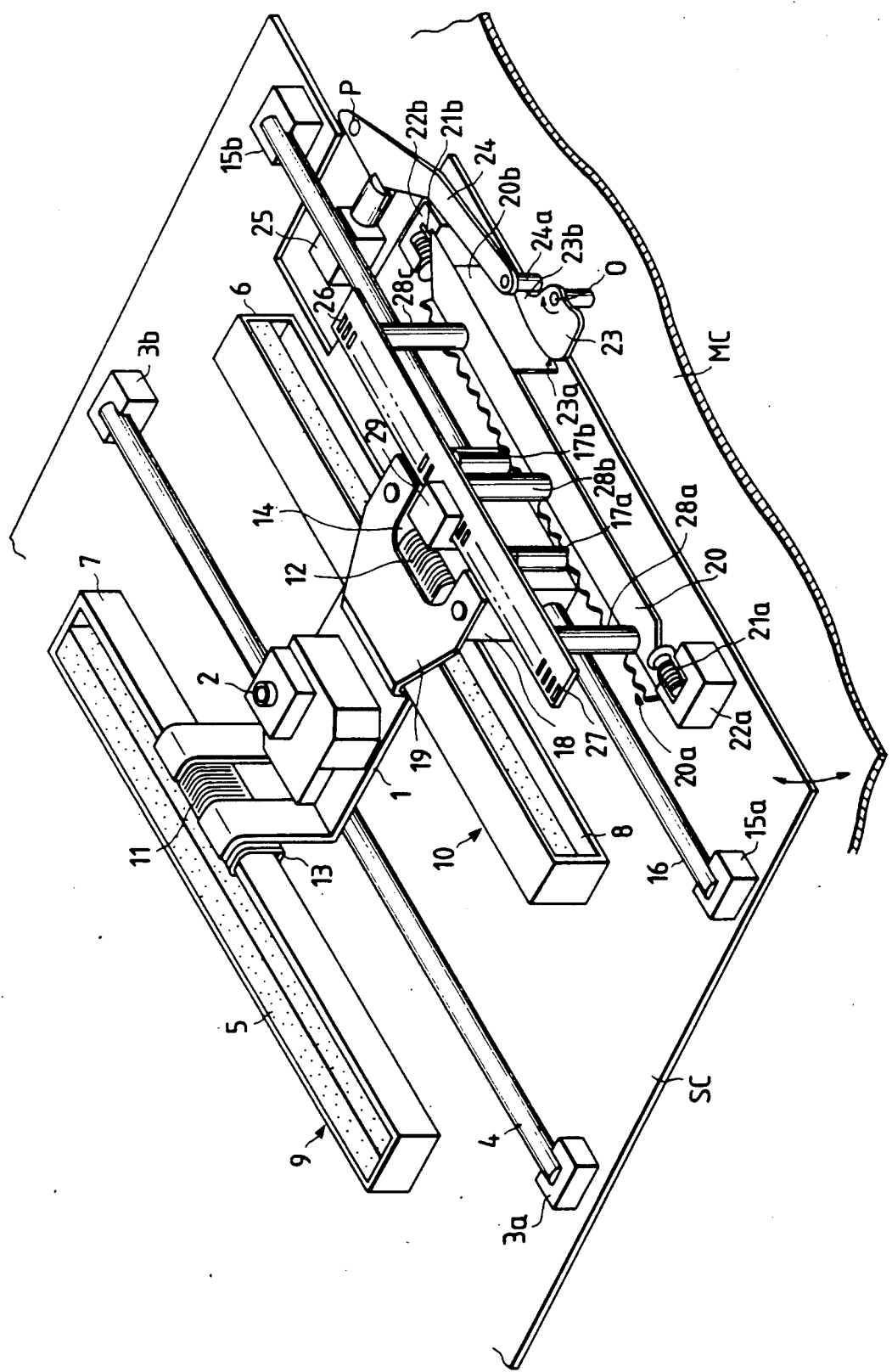
FIG. 1 is a schematic view of a slider drive mechanism provided with a slider controller which is an embodiment of the present invention.

FIG. 1 shows a slider drive mechanism provided with a slider controller which is one of the embodiments. As shown in FIG. 1, a slider 1 supports an optical pickup 2 for reading recorded information from a disk (not shown) and is movable on a straight guide shaft 4 in the longitudinal direction thereof. The guide shaft 4 is supported at each end by supports 3a, 3b. Magnets 5 and 6, which extend in parallel with the guide shaft 4, and rectangular annular yokes 7 and 8, which are coupled to the magnets to form closed magnetic loops, constitute magnetic circuit sections 9 and 10 positioned at both sides of the slider 1 along the guide shaft. Coils 11 and 12 are provided around the yokes 7 and 8, and secured to the slider 1 by coil holders 13 and 14. The magnetic circuit sections 9 and 10 and the coils 11 and 12 constitute a moving-coil linear motor for directly moving the slider 1 on the guide shafts 4 and 16 in the longitudinal direction thereof. The coil 11 serves to detect the speed of the slider 1, while the other coil 12 serves to move the slider. The slider drive mechanism includes the linear motor and the guide shafts 4 and 16 on which the slider 1 is movably supported. The mechanism is supported on an auxiliary chassis SC which in turn is supported at one end in the longitudinal direction, in such a manner that the auxiliary chassis can be swung, relative to a main chassis MC, in a direction within a plane containing the optical axis of the pickup 2. The inclination of the auxiliary chassis SC to the main chassis MC can be adjusted by a tilting mechanism (not shown) provided at the other end of the guide shaft 4. The tilting mechanism is thus disposed, for instance, under the support 3a and is mounted on the main chassis MC. The inclination of the pickup 2 supported by the auxiliary chassis SC can thus be adjusted so that the optical axis of an information reading light beam emitted from the pickup is made perpendicular to the information recording surface of the disk. A tilting servo-controller including such a tilting mechanism is described in detail in the Japanese Utility Model Application (OPI) No. 168835/84 (the term "OPI" as used herein means an "unexamined published application").

The straight guide shaft 16 is supported at both the ends thereof by supports 15a and 15b and extends in parallel with the other guide shaft 4 opposite it across the magnetic circuit section 10. A moving body 18 having projections 17a and 17b on the side wall of the body is slidably fitted on the guide shaft 16 and linked to the slider 1 by a coupler 19 so that the slider and the body are moved together.

A slender locking plate 20 having a partially L-shaped cross section is provided along the guide shaft 16, and includes a wave-shaped locking portion 20a extending along one side edge of the plate and capable of being engaged with and disengaged from the projections 17a and 17b of the moving body 18. The locking plate 20 further includes an engaged portion 20b extending along the other side edge of the plate and having a contact surface which extends nearly in parallel with the direction of the swinging of the auxiliary chassis SC when the locking plate is in a state shown in FIG. 1. The locking plate 20 is supported in a swingable manner by rocking shafts 21a and 21b and bearings 22a and 22b at both the ends of the plate. A pushing cam 23 is provided as a movable member near the engaged portion 20b of the locking plate 20 and urged, by an urging means, in a direction shown by an arrow in FIG. 1, and has a cam surface 23a, wherein the distance between the cam surface and the fulcrum O of the turning of the cam is continuously changed in the circumferential direction of the cam. The cam surface 23a is in contact with the engaged portion 20b of the locking plate 20.

When the pushing cam 23 is turned about the fulcrum O in the direction shown by the arrow in FIG. 1, the cam surface 23a is displaced across a plane parallel with the direction of the swinging of the auxiliary chassis SC, so that the cam surface pushes the engaged portion 20b. The claw 23b of the pushing cam 23 is engaged with a pin 24a provided on a rocking arm 24 at one end thereof. The arm 24 can be swung about a fulcrum P by a plunger 25. When electric power is applied to a disk player having the slider drive mechanism, the plunger 25 is energized. A slider locking mechanism is composed of the locking plate 20, the pushing cam 23, the rocking arm 24 and the plunger 25, and can appropriately lock the slider 1. The guide shaft 16 supporting the moving body 18 slidably thereon and the locking plate 20, which is optionally engaged with or disengaged from the moving body, are supported on the auxiliary chassis SC. The pushing cam 23 and the plunger 25, which turns the cam through the rocking arm 24, are supported on the main chassis MC.

A light blocking plate 27 having a large number of slits 26 at prescribed intervals is disposed along the guide shaft 16 and is supported by three pillars 28a, 28b and 28c on the auxiliary chassis SC. A position sensor 29 composed of a light emitter and a light receiver, between which the slit 26 of the light blocking plate 27 is located, is secured to the moving body 18 so that the position sensor is moved together with the slider 1 and the moving body.

Figure 2:
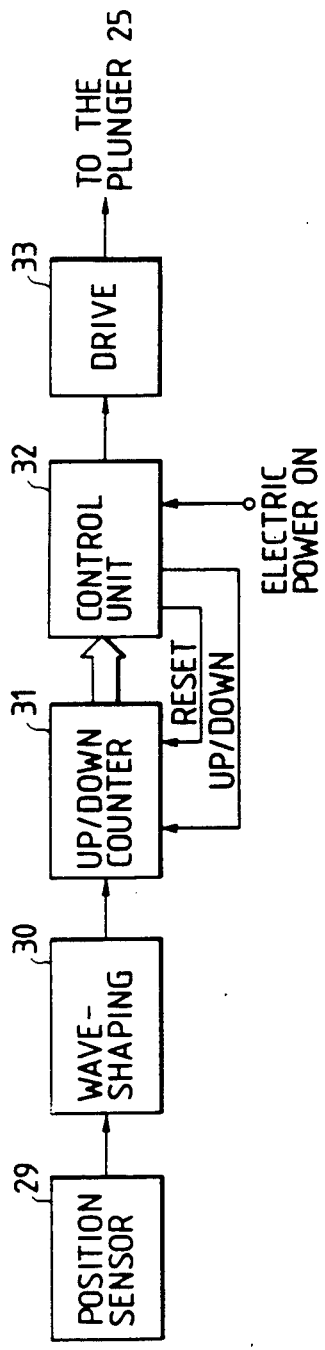
FIG. 2 is a block diagram of the control circuit of the slider controller.

The output from the position sensor 29 is shaped into a pulse by a wave-shaping circuit 30, as shown in FIG. 2. The pulse is supplied to an up/down counter 31, the count of which is sent to a control unit 32 in the form of a microcomputer. When the quantity of the change of the count of the counter 31 per unit time has become smaller than a prescribed value, the control unit 32 regards that fact as meaning that the slider 1 has reached one movement limit position on the support 3a. At that time, the control unit 32 resets the up/down counter 31, and controls the up/down counting thereof in terms of the direction of the movement of the pickup 2, which depends on a disk player operation mode such as leading-in, leading-out, playing, search and scanning. In addition, the control unit 32 takes out the count of the counter 31 as information on the position of the pickup 2 and the slider 1, and sends out the information to the outside if necessary.

When electric power is applied to the disk player, the control unit 32 controls the driving operation of a drive circuit 33 so that the plunger 25 of the slider locking mechanism is kept energized. In the stoppage mode of the disk player, the control unit 32 monitors the count of the up/down counter 31 so that when the counter has changed more than a prescribed value, the control unit judges that the slider 1, which should not move in the stoppage mode, has moved due to a disturbance such as external vibration. In the case of such a judgment, the control unit 32 de-energizes the plunger 25 through the drive circuit 33 so that the slider 1 is locked not to move.

Figure 3:
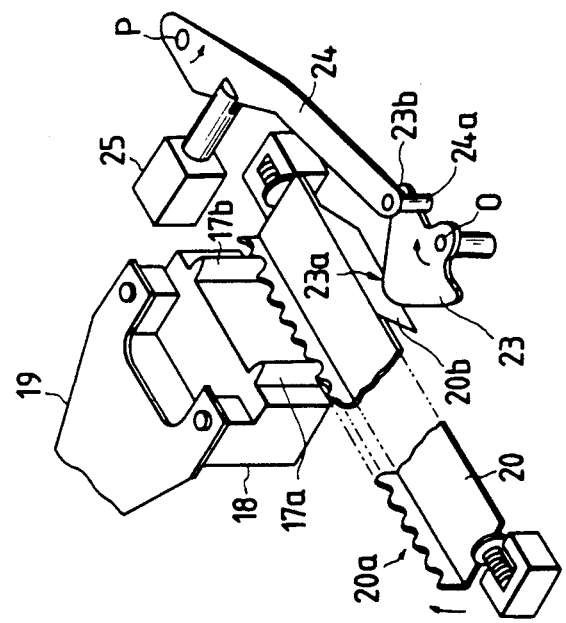
FIG. 3 is a schematic view of the slider locking mechanism of the slider controller in the unlocked state.

The operation of the slider locking mechanism will now be described in detail with reference to FIGS. 3 and 4. When electric power is applied to the disk player, the plunger 25 is energized, as shown in FIG. 3 indicating the unlocked state of the slider 1, so that the rocking arm 24 is swung clockwise as shown by the arrow in FIG. 3 and turns the pushing cam 23 counterclockwise as shown by the arrow in FIG. 3 against the urging force of the urging means. Thus, the cam surface 23a of the pushing cam 23 is engaged with the engaged portion 20b of the locking plate 20 at a portion of the cam surface where the distance between the fulcrum O of the cam and the cam surface is at a minimum. At that time, the pushing force of the pushing cam 23 applied to the engaged portion 20b is at a minimum. Therefore, because the weight of the half of the locking plate 20 that includes the wave-shaped locking portion 20a on one side of the pivot axis of the plate is greater than the other half on the opposite side of the axis, the plate is pivoted to move the locking portion down to disengage the locking portion from the projections 17a and 17b of the moving body 18. As a result, the moving body 18 is unlocked so that the body and the slider linked thereto are moved together.

Figure 4:
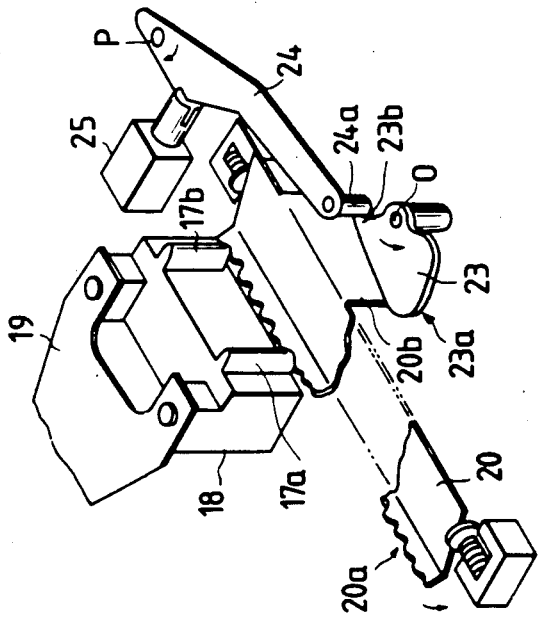
FIG. 4 is a schematic view of the slider locking mechanism in the locked state.

During the stoppage mode, when the control unit 32 detects that the slider 1 (which should not move in that mode) has moved, the control unit de-energizes the plunger 25 through the drive circuit 33 so that the rocking arm 24 is swung counterclockwise as shown by the arrow in FIG. 4 indicating the locked state of the slider 1. As a result, the pushing cam 23 is turned clockwise as shown by the arrow in FIG. 4 by the urging force of the turning means so that the cam swings the locking plate 20 by pushing the engaged portion 20b thereof at the protrusive part of the cam surface 23a of the cam, on which the distance between the fulcrum O of the turning of the cam and the cam surface is at a maximum. Therefore, the locking portion 20a of the locking plate 20 is moved up to a position in which the locking portion is engaged with the projections 17a and 17b of the moving body 18. The projections 17a and 17b are then fitted in the recesses of the wave-shaped locking portion 20a of the locking plate 20 so that the moving body is locked, namely, the slider 1 linked thereto is locked.

When the disk player is shifted from the stoppage mode into another mode, the control unit 32 energizes the plunger 25 through the drive circuit 33 again so that the moving body 18 linked to the slider 1 is unlocked.

When electric power is not supplied to the disk player, a drive current is not supplied to the plunger 25, so that the moving body 18 and the slider are automatically unlocked.

In the disk player having the slider 1 with a small coefficient of static friction and the linear motor for moving the slider, the position of the slider is monitored in the stoppage mode of the disk player so that if the slider has moved, it is locked by the slider locking mechanism as described above. Therefore, even if a disturbance such as external vibration acts on the disk player, the slider 1 is prevented from moving. As a result, the disk player can be smoothly shifted into another mode. Since the slider locking mechanism is put into locking action only when the slider 1 has moved in the stoppage mode of disk player, the number of times the slider is locked is minimized so that the number of times of generation of a locking noise, which is unpleasant to the user of the disk player, is minimized and the life of the slider locking mechanism is lengthened.

Since the locking plate 20 of the slider locking mechanism is supported on the auxiliary chassis SC and the pushing cam 23 and plunger 25 of the mechanism are supported on the main chassis MC, the locking portion 20a of the locking plate is tilted together with the moving body 18 no matter what position the auxiliary chassis is swung to, so that the slider 1 can be surely locked despite adjusting the inclination of the optical pickup 2 through the swinging of the auxiliary chassis. Since the plunger 25 of relatively large weight is provided on the main chassis MC which is not moved by adjusting the inclination of the pickup 2, the load on a driver for the adjustment is relatively small. Further, since the pushing cam 23 is provided between the locking plate 20 and the plunger 25 which serves as a driver to turn the cam to swing the locking plate, the locked state of the moving body 18 and the slider 1 linked thereto is surely maintained even if a strong force acts on the locking portion 20a of the locking plate to swing it. This is the case because a force which acts from the engaged portion 20b of the plate to the pushing cam has a direction extending from the point of the action of the force on the cam toward the fulcrum O of the turning of the cam so as not to generate a force couple that would turn the cam.

Although the slider locking mechanism is put into action to lock the slider 1 only when the slider has moved in the stoppage mode of the disk player, the present invention is not confined thereto and may be otherwise embodied so that the slider locking mechanism is put into action to lock the slider every time the disk player is placed in the stoppage mode, though the number of times of generation of a locking noise is increased in such an embodiment.

Although the position sensor 29 and the up/down counter 31, which counts the outputs from the sensor and sends out the counted value as the information on the position of the slider, are used as means for detecting the movement of the slider through a determination that the counted value has changed more than the prescribed value, the present invention is not confined thereto and may be otherwise embodied so that whether the counter electromotive force caused in the coil of the linear motor has become higher than a predetermined level or not is monitored to detect the movement of the slider. Thus, an suitable means may be provided for the detection of the movement of the slider which should not move in the stoppage mode of the disk player.

FIG. 5 shows a slider drive mechanism according to an alternative embodiment. As shown in FIG. 5, a slider 1 supports an optical pickup 2 for reading recorded information from a disk (not shown), and is movable along straight guide shafts 4 and 16 supported at both the ends thereof by supports 3a, 3b, and 15a, 15b, respectively, and extending in parallel with each other. Magnets 5 and 106 are provided at both sides of the slider 1, and extend in parallel with the guide shafts 4 and 16. Rectangular annular yokes 7 and 108 are coupled to the magnets 5 and 106 to form closed magnetic loops. The magnets 5 and 106 and the yokes 7 and 108 constitute magnetic circuit sections 9 and 110, which generate magnetic fields perpendicular to a plane containing the optical axis of the pickup 2 and the direction of swinging of an auxiliary chassis SC. Coils 11 and 112 are provided on coil holders 13 and 114 around the yokes 7 and 108 of the magnetic circuit sections 9 and 110 and secured to the slider 1 so that the coils are movable in the longitudinal and transverse directions of the yokes 7 and 108.

The magnetic circuit sections 9 and 110 and the coils 11 and 112 constitute a moving-coil linear motor for directly moving the slider 1. The coil 112 serves as a drive coil so that it is linearly moved because of interaction with the magnetic field of the magnetic circuit section 110 when a drive current is supplied to the coil. The other coil 11 serves as a speed detection coil so that a counter electromotive force corresponding to the speed of the movement of the slider 1 is produced in the coil when the coil is moved together with the slider. The slider drive mechanism is thus constituted.

The guide shafts 4 and 16 supporting the slider 1 movably thereon are supported on the auxiliary chassis SC. The magnetic circuit sections 9 and 110 of the linear motor are supported on a main chassis MC. The other portions of the slider drive mechanism are the same in constitution and operation as those of the slider drive mechanism shown in FIG. 1 and are denoted by the same reference symbols in FIG. 5 as in FIG. 1.

What is claimed is:

1. A slider controller for a disk player, the disk player including a pickup for reading recorded information from an information record disk and being mounted on a slider, the slider being movable in the radial direction of said disk by a drive motor, the drive motor being supported on an auxiliary chassis which is swingable relative to a main chassis of the disk player, said slider controller comprising:

locking means movably supported on said auxiliary chassis and including a locking portion for being engaged with or disengaged from said slider, and a contact surface;

a movable member supported on said main chassis for movement and being in contact with said contact surface of said locking means; and drive means supported on said main chassis for moving said movable member, such that upon operation of said drive means during a stoppage mode of said disk player said movable member is moved to push said contact surface of said locking means thereby engaging said locking portion with said slider.

2. A slider controller according to claim 1, further comprising a control means for controlling a driving operation of said drive means so as to engage said locking portion with said slider in said stoppage mode of the disk player.

3. A slide controller according to claim 2, further comprising a movement detection means for detecting the movement of said slider, the driving operation of said drive means being controlled by said control means only when said detection means has generated a detection output in the stoppage mode of the disk player.

4. A slider controller according to claim 1, wherein said drive motor is a linear motor.

5. A slider drive mechanism for a disk player, the disk player including a pickup for reading recorded information from an information record disk, a slider for supporting said pickup, a main chassis and an auxiliary chassis which is swingable relative to said main chassis, said slider drive mechanism comprising:

a guide shaft for guiding said slider being supported on said auxiliary chassis and extending in the radial direction of said disk;

drive means for moving said slider, wherein said drive means comprises a moving-coil linear motor including a magnetic circuit section disposed on said main chassis for generating a magnetic field perpendicular to a direction of swinging of said auxiliary chassis and extending along said guide shaft, and a coil which is linearly movable due to interaction with said magnetic field.

6. A slider controller according to claim 1, wherein said movable member is a pushing cam, and further wherein said drive means includes a plunger and a rocking arm, said plunger rotating said pushing cam via said rocking arm.

* * * * *